(12) United States Patent
Okazaki

(10) Patent No.: US 7,757,105 B2
(45) Date of Patent: Jul. 13, 2010

(54) ELECTRONIC DEVICE SYSTEM AND CONTROLLER

(75) Inventor: Masaki Okazaki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 645 days.

(21) Appl. No.: 11/755,046

(22) Filed: May 30, 2007

(65) Prior Publication Data

US 2007/0283174 A1 Dec. 6, 2007

(30) Foreign Application Priority Data

May 30, 2006 (JP) ............... 2006-149657

(51) Int. Cl.
*G06F 1/26* (2006.01)
(52) U.S. Cl. .............. 713/300; 713/310; 713/330; 713/340
(58) Field of Classification Search ......... 713/300, 713/310, 330, 340
See application file for complete search history.

(56) References Cited

U.S. PATENT DOCUMENTS 6,772,354 B2 8/2004 Takenaka et al.

2001/0032279 A1 * 10/2001 Noda et al. ............ 710/105

FOREIGN PATENT DOCUMENTS

| JP | 60-160419 A | 8/1986 |
| JP | 2001-236149 A | 8/2001 |
| JP | 2005-100287 A | 4/2005 |

* cited by examiner

*Primary Examiner*—Tse Chen
(74) *Attorney, Agent, or Firm*—Crowell & Moring LLP

(57) ABSTRACT

In an electronic device system where a controller and a target device are connected to each other via an IEEE 1394 serial bus, the controller comprises: command sending means for sequentially sending via the bus a power control command to change the power status of the target between the power-on state and the power-off state and a power status command to inquire the power status of the target device; change time calculating means for calculating power status change time needed for the target device to change the power status between the power-on state and the power-off state based on a response to the power status command that is received from the target device; and time interval determining means for determining a time interval from sending of the power control command to sending of the power status command based on the power status change time.

6 Claims, 6 Drawing Sheets

FIG. 2

| CTS (0000) | ctype response | subunit_type | subunit_id | opcode | operand |

FIG.6

| GUID | POWER-ON STATE CHANGE TIME | POWER-OFF STATE CHANGE TIME |
|---|---|---|
| DEVICE B GUID | 1000ms | 800ms |
| DEVICE C GUID | 1903ms | 2002ms |
| DEVICE D GUID | 200ms | 200ms |
| DEVICE E GUID | 5000ms | 4501ms |
| DEVICE F GUID | 2400ms | 1000ms |

ELECTRONIC DEVICE SYSTEM AND CONTROLLER

BACKGROUND OF THE INVENTION

1. Field of the Invention

The present invention relates to an electronic device system in which a plurality of electronic devices are connected to a network via an IEEE 1394 bus, and relates to a technique for reducing bus bandwidth usage when powering on and off a connected electronic device by remote control via the bus from another device.

2. Description of the Related Art

In recent years, IEEE 1394 serial bus (IEEE Std 1394-1995 Standard for a High Performance Serial Bus, which is hereinafter referred to as "IEEE 1394") interfaces have become widespread as digital data interfaces to network digital electronic devices including audio-video devices such as a set-top box (hereinafter referred to as "STB"), a digital television, a digital video cassette recorder (DVCR), and a DVD recorder. This IEEE 1394 is a serial bus that can be used by a plurality of digital electronic devices on a network to exchange digital data between each other or to control each other.

In such a system where a plurality of electronic devices are connected via an IEEE 1394, one of the electronic devices (referred to as "device P") controls the power supply of another device (referred to as "device Q") on the same IEEE 1394 in the following manner. For example, when the device P powers on the device Q, the device P sends to the device Q an AV/C power control command of AV/C Digital Interface Command Set (hereinafter referred to as "AV/C commands") with power_state=POWER ON. After the sending, the device P typically continues to periodically send an AV/C power status command to inquire the power status of the device Q until the device Q changes to the power-on state. Thereby, the device P checks whether or not the power status of the device Q has changed. However, this periodical sending of the command increases the amount of bandwidth used on the IEEE 1394 bus, thus reducing the efficiency in the use of the bus.

SUMMARY OF THE INVENTION

An object of the present invention is to provide an electronic device system that includes a plurality of electronic devices networked via an IEEE 1394 serial bus so as to enable one of the devices as a controller to control the power supply of another device as a target device and that can reduce bus bandwidth usage when a power status command to inquire the power status is sent from the controller to the target device.

According to an aspect of the present invention, this object is achieved by an electronic device system in which a plurality of electronic devices each comprising an IEEE 1394 serial interface having an AV/C Digital Interface Command Set (hereinafter referred to as an AV/C command) are networked via an IEEE 1394 serial bus.

The plurality of electronic devices include a controller on the network and a target device for which the controller performs power control.

The controller comprises: command sending means for sequentially sending via the bus a power control command to change power status of the target device between power-on state and power-off state and a power status command to inquire the power status of the target device; change time calculating means for calculating power status change time needed for the target device to change the power status between the power-on state and the power-off state based on a response to the power status command that is received from the target device; storage means for storing the power status change time calculated by the change time calculating means; and time interval determining means for determining a time interval from sending of the power control command to sending of the power status command based on the power status change time stored in the storage means when the controller performs power control for a second or subsequent time.

With this configuration, the previously calculated time needed for each of target devices to change the status of the main power supply between the power-on state and the power-off state can be used as the optimal time interval for sending the power status command to each of the target devices when the power control is performed for a second or subsequent time. This can eliminate the need to unnecessarily send the power status command, thus decreasing the number of times the power status command is sent so as to reduce the amount of bandwidth used on the IEEE 1394 serial bus. Accordingly, the efficiency in the use of the IEEE 1394 serial bus bandwidth can be improved at the time of power control.

Preferably, the target device has a main power control portion to control a main power supply in the target device and a power status detecting portion to detect power status of the main power supply, wherein after sending the power control command to the main power control portion in the target device, the command sending means in the controller continues to periodically send the power status command until the target device changes to the power-on state or the power-off state, wherein when the power status detecting portion in the target device detects a power status change, the change time calculating means determines the power status change time by calculating a time interval between time at which the power control command is sent and time at which a response indicating completion of the power status change is received from the target device.

Preferably, when the controller performs power control for the target device for a second or subsequent time, the controller sends the power status command to the target device after the power status change time has passed from sending of the power control command.

According to a second aspect of the present invention, the above object is achieved by a controller to be connected to an IEEE 1394 serial bus, comprising: command sending means for sequentially sending via the bus a power control command to change power status of a target device on a network between power-on state and power-off state and a power status command to inquire the power status of the target device; change time calculating means for calculating power status change time needed for the target device to change the power status between the power-on state and the power-off state based on a response to the power status command that is received from the target device; storage means for storing the power status change time calculated by the change time calculating means; and time interval determining means for determining a time interval from sending of the power control command to sending of the power status command based on the power status change time stored in the storage means when the controller performs power control for a second or subsequent time.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2 shows an AV/C command frame for an AV/C command that is used in the system;

FIG. 6 is a table showing an example of power-on state and power-off state change times for each of target devices that are determined in the power status change time determining process shown in FIG. 4.

DESCRIPTION OF THE PREFERRED EMBODIMENTS

Referring now to FIG. 1 to FIG. 5, an electronic device system embodying the present invention is described. The present invention relates to the reduction of bus bandwidth used when a controlling electronic device (controller) for remotely controlling another electronic device (target device) on a network controls the power supply of the target device via the network in an electronic device system where a plurality of electronic devices such as audio-video devices, each of which comprises an IEEE 1394 serial interface having an AV/C Digital Interface Command Set (hereinafter refer to as "AV/C commands"), are networked via an IEEE 1394 serial bus. It is to be noted that the following description of preferred embodiment of the present invention has been presented for purposes of illustration and description, and is not intended to be exhaustive or to limit the present invention to the precise form disclosed.

Figure 1:
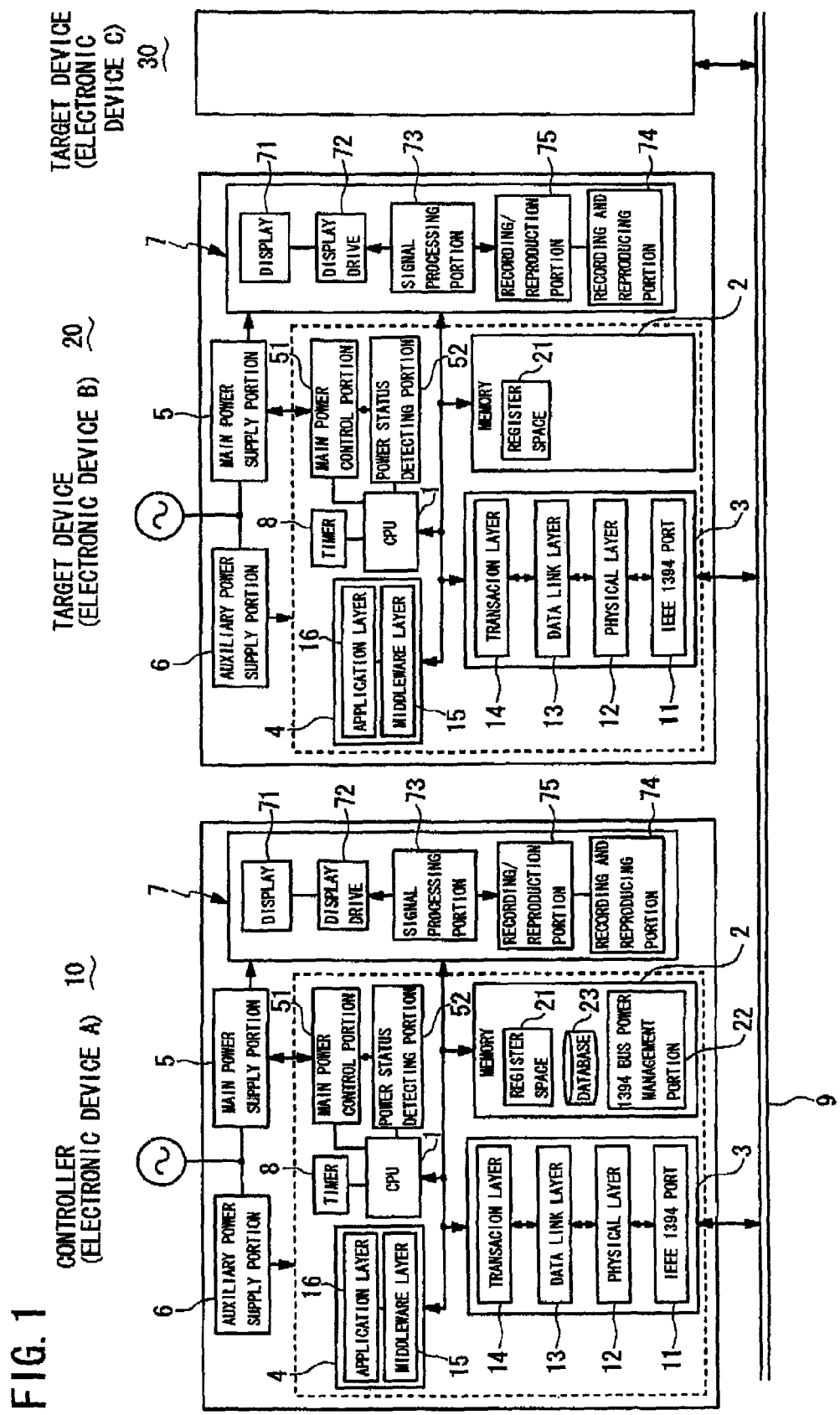
FIG. 1 is an electrical block diagram of an electronic device system according to one embodiment of the present invention.

FIG. 1 is an electrical block diagram of the electronic device system according to this embodiment. In this electronic device system, a plurality of electronic devices (devices A, B, and C) each comprising an IEEE 1394 serial interface are networked via an IEEE 1394 serial bus 9 (hereinafter referred to as "bus"). The electronic device A is a controller 10 that performs power control for the other electronic devices on the network. The electronic devices B and C are target devices 20 and 30 for which the controller 10 performs power control. It is to be noted that the internal configuration of the target device 30 is similar to that of the target device 20 and not shown in the figure.

As shown in FIG. 1, the controller 10 comprises: a CPU 1 (which corresponds to change time calculating means and time interval determining means in claims) that controls each component in the controller; a memory 2 that stores information needed for system control by the CPU 1; an IEEE 1394 serial interface portion 3 (hereinafter referred to as "1394 IF portion"); an AV protocol portion 4; a main power supply portion 5 and an auxiliary power supply portion 6 each with an AC power input; a main operating portion 7 that is supplied power from the main power supply portion 5; and a timer 8 that serves as a system clock for the CPU 1. The controller 10 further has a main power control portion 51 that controls the on/off status of the main power supply portion 5 under the control of the CPU 1, and a power status detecting portion 52 that detects the power status (on/off status) of the main power supply portion 5 under the control of the CPU 1. The CPU 1, the 1394 IF portion 3, and the AV protocol portion 4 correspond to command sending means in claims.

The memory 2 stores various control programs to be executed under the control of the CPU 1 and various kinds of data to be used for execution of the programs, and includes: an 1394 bus power management portion 22 that comprises a power control program to manage the power control via the bus 9; and a register space 21 that stores various kinds of information such as a topology map of the devices on the IEEE 1394 bus and the bus addresses of the devices. The memory 2 further has a database 23 (storage means in claims) that stores power-on state change times and power-off state change times, which are described later.

The 1394 IF portion 3 corresponds to the communication layer of the IEEE 1394, and comprises: an IEEE 1394 port 11 that serves as a communication port to the bus 9; a physical layer 12 that serves as a physical and electrical interface to the bus 9; a data link layer 13; and a transaction layer 14. The physical layer 12 performs automatic recognition of a connected node and bus arbitration between nodes on the bus 9. The data link layer 13 is a layer that performs signal processing between the physical layer 12 and the transaction layer 14. For example, the data link layer 13 performs addressing for indicating a 64-bit address in accordance with the IEEE 1212 standard, data checking, packet transmission, and cycle control for isochronous transfer. Used in the addressing are a bus ID for identification of an IEEE 1394 bus and a node ID of each device connected to the bus 9 identified by the bus ID. The devices connected to the bus 9 are identified, on the bus 9, by the bus ID and the node ID. The node ID is a unique identification number assigned to each electronic device (node) connected to the IEEE 1394 bus. The identification number is stored in a Configuration ROM that is included in the memory 2 to store device specific information. Provision of the identification number enables easy identification of each device. The transaction layer 14 performs processing on asynchronous data. The communication layer in the controller 10 is controlled through bus management (serial bus management) by the CPU 1 so as to network the plurality of target devices 20 and 30 (electronic devices B and C) on the bus 9.

The AV protocol portion 4 includes a middleware layer 15 and an application layer 16, and serves as an AV protocol layer of IEEE 1394 that relates to a signal transmission protocol to establish a virtual input/output path between devices, real-time data transmission to transmit signals having various formats in the form of packets, control signals to control the operation of a device connected via an IEEE 1394 bus, and so on. Further, the AV protocol portion 4 contains AV/C commands (AV/C Digital Interface Command Set) for remote control of an audio-video device connected via an IEEE 1394 network. According to the specifications of the AV/C commands, an AV/C command has to be sent in the form of an AV/C command frame shown in FIG. 2 described later. An AV/C command frame is transferred in the asynchronous transfer mode.

The main operating portion 7 comprises: a display 71 to display video data; a display drive 72 to drive the display 71; a signal processing portion 73 to process video data signals sent via the bus 9 for display and recording of the signals; a recording and reproducing portion 74 to record and reproduce the video data signals; and a recording/reproduction drive 75 to drive the recording and reproducing portion 74. With these components, the main operating portion 7 can display, record, and reproduce video signals such as television signals and camera signals.

The main power supply portion 5 supplies power to drive the above described main operating portion 7. When a user does not use the controller 10 for display, recording, or other purpose, the power supply to the main operating portion 7 is usually tamed off to switch the controller 10 into a power saving mode where only the auxiliary power supply portion 6 is on. The controller 10 enters the power sang mode when the main power control portion 51 turns off a switch for power supply from the main power supply portion 5 to the main operating portion 7 under the control of the CPU 1. Then, the power status detecting portion 52 detects the power-off (or power-on) state and notifies the CPU 1 of the power status. Thus, the CPU 1 can recognize that the power supply from the main power supply portion 5 to the main operating portion 7 has been turned off (or turned on). In order to entirely activate the controller 10 from the power saving mode, the main power control portion 51 turns on the switch for power supply from the main power supply portion 5 to the main operating portion 7.

For maintaining the connection of the IEEE 1394 bus, the auxiliary power supply portion 6 always supplies power to each of the CPU 1, the memory 2, the 1394 IF portion 3, the AV protocol portion 4, the timer 8, the main power control portion 51, and the power status detecting portion 52 (components surrounded by a dashed line in FIG. 1). This allows a connection between devices via the bus 9 to be maintained for communication even after the main power supply portion 5 is switched off into the power saving mode.

The target device 20 or 30 is basically configured similar to the controller 10, but it has no 1394 bus power management portion 22 in its memory 2. A main power supply portion 5 in the target device 20 or 30 is remotely controlled by the controller 10.

In the above described electronic device system, the controller 10 controls the target device 20 by using an AV/C command. This control with an AV/C command is implemented through one-to-one communication between the controller 10 to issue a command and the target device 20 to receive the command. The target device 20 executes a received command and sends the result back to the controller 10. The controller 10 performs the power control for the target device 20 by using a power control command (command for changing the power status between the power-on state and the power-off state) that is one of AV/C commands. An AV/C command is sent using an AV/C command frame.

Referring now to FIG. 2, the AV/C command frame is described. As shown in FIG. 2, this AV/C command frame has a four-bit CTS (0000) indicating the AV/C command set, a ctype (function classification of the command) or a response (result of the command executed), a subunit_type indicating the destination of the command, a subunit_id indicating the source of the response, an opcode indicating the type of the command, and an operand indicating the content of the command. In the case where the type of the AV/C command is a power status command to inquire the power status, a code "B2h" indicating "power" is set as the opcode, and a code "7Fh" is set as the operand. In a response to the above power status command, the target device 20 replaces the code "7Fh" as the operand with a code corresponding to the current power status of the target device 20. More particularly, when the target device 20 receives a power status command from the controller 10, it sends a response to the command back to the controller 10. In the response, a code "60h" or "70h" is placed in the power_state area. The code "70h" indicates that the target device 20 is currently in the power-on state while the code "60h" indicates that the target device 20 is currently in the power-off state. By referencing the code of the power-_state in the response, the controller 10 can recognize the power status of the target device 20 or another device connected to the bus 9.

Figure 3:
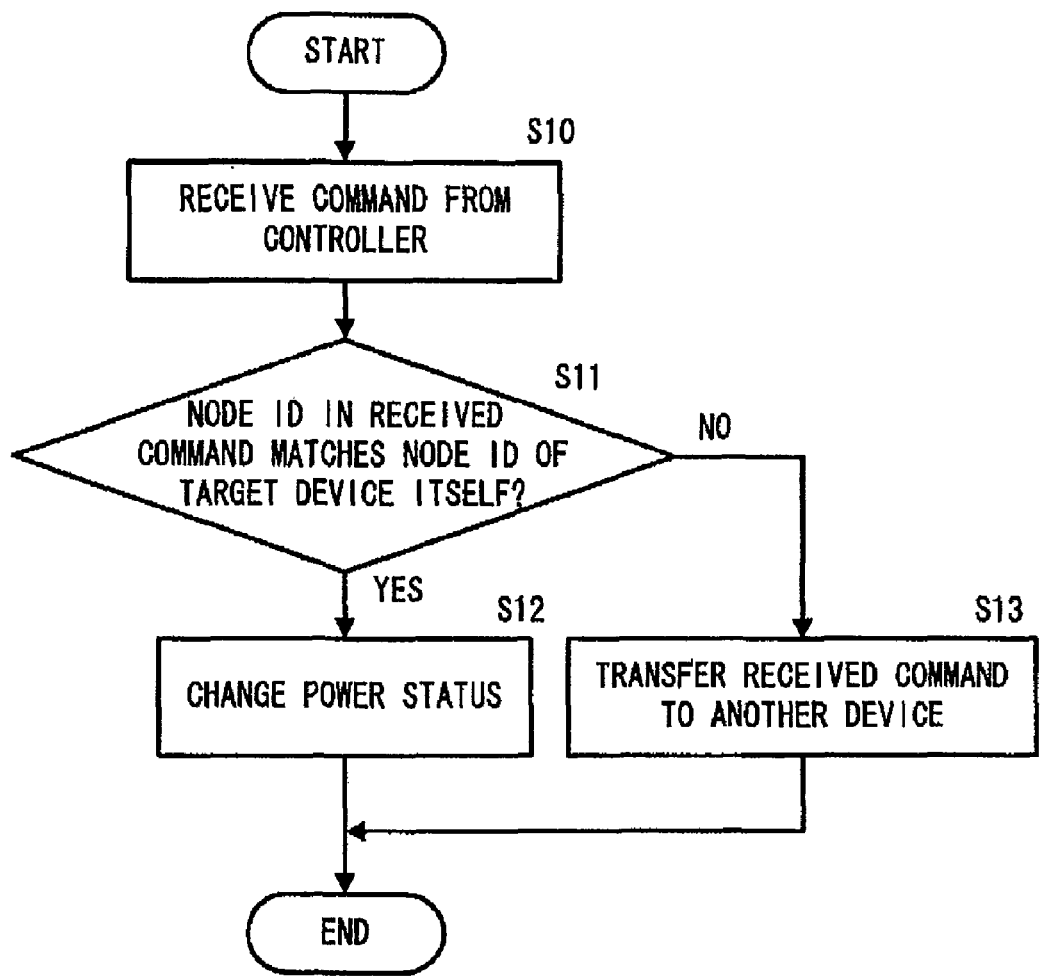
FIG. 3 is a flowchart showing the steps of a process for power control that is executed by a target device in the system.

When a power control command in the form of an AV/C command is sent from the controller 10 so as to power on or power off the target device 20, the CPU 1 in the target device 20 determines whether the sent power control command is a command to the device 20 itself or a command to another device. As a result, when the command is one sent to the target device 20, the CPU 1 in the target device 20 instructs the main power control portion 51 in the target device 20 to turn on or turn off the main power supply portion 5 in accordance with the sent power control command. On the other hand, when the power control command sent from the controller 10 is one to another device, the CPU 1 in the target device 20 transfers the power control command to the another device. FIG. 3 is a flowchart showing the steps of this process. As shown in FIG. 3, the target device 20 receives through its 1394 IF portion 3 a power control command to change the power status from the controller 10 (S10). When the node ID in the command matches the node ID of the target device 20 itself (YES at S11), the target device 20 transfers the command to the CPU 1 therein. The CPU 1 then controls the main power control portion 51 to change the power status of the main power supply portion 5 (S12). When the node IDs are different (NO at S11), the target device 20 transfers the command to another device (S13).

Figure 4:
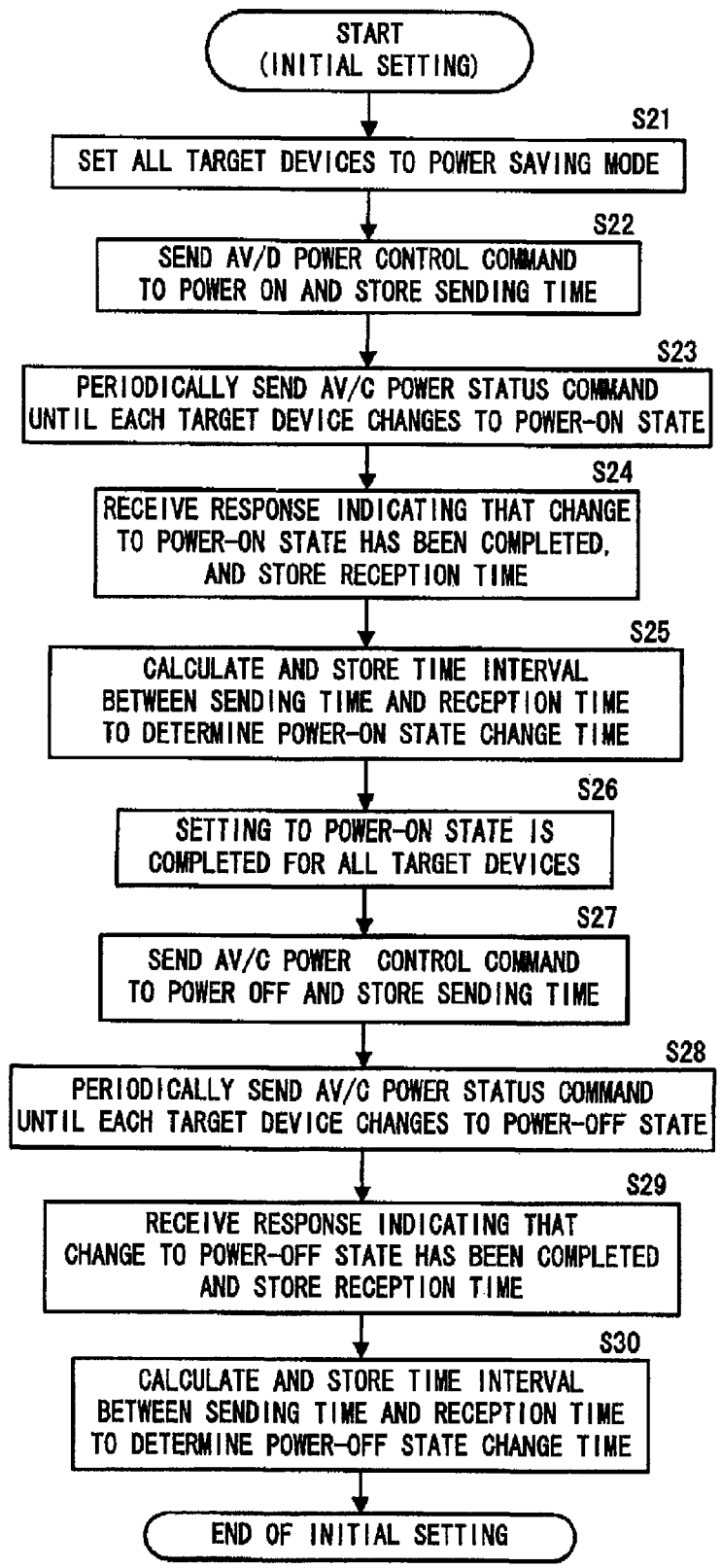
FIG. 4 is a flowchart showing the steps of a process for determination of power status change times in the system.
Figure 5:
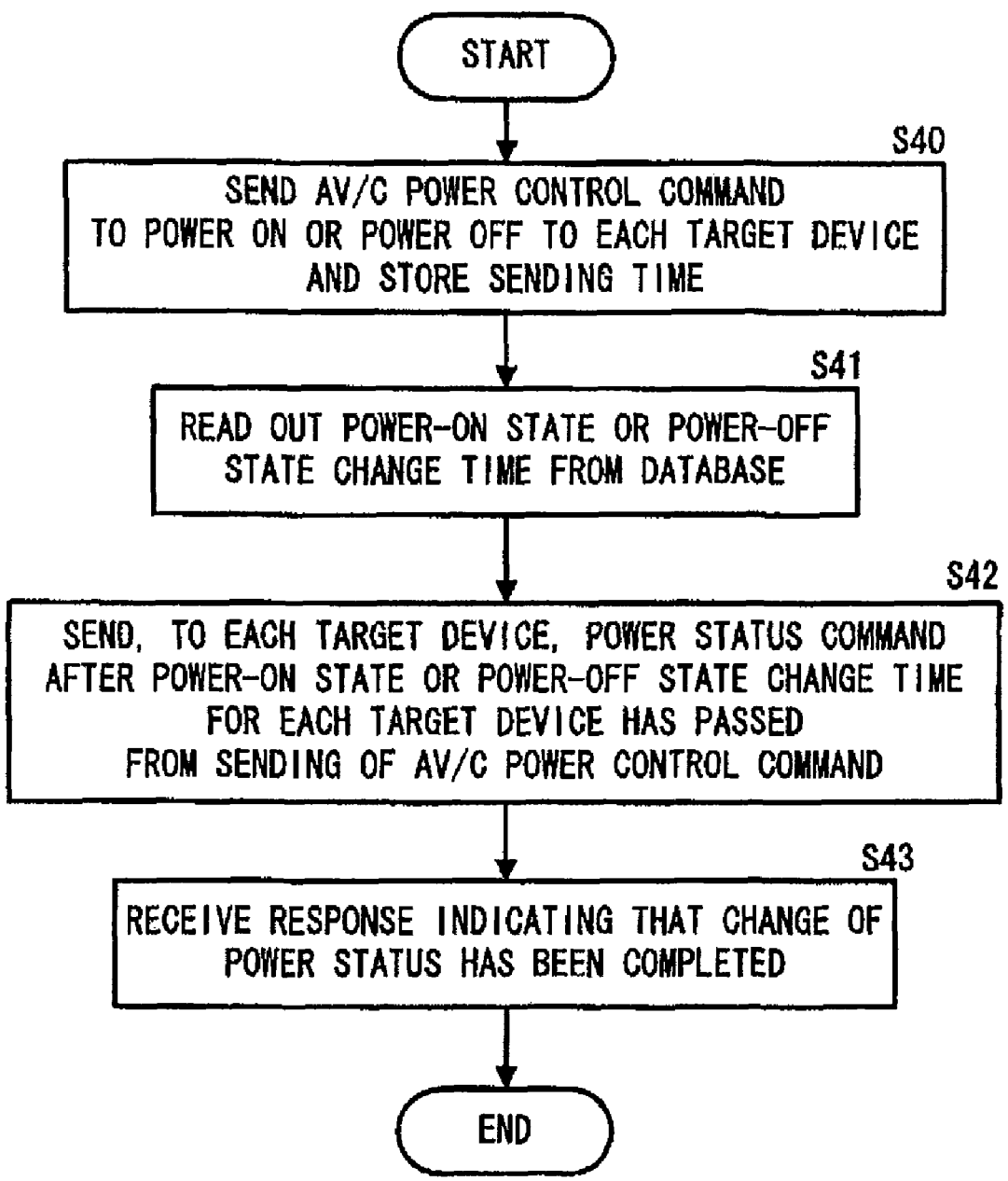
FIG. 5 is a flowchart showing the steps of a process for power control for a second or subsequent time in the system.

Referring now to FIG. 4 and FIG. 5, it is described how the controller 10 performs power control for the target device 20 in the electronic device system according to this embodiment. First, the CPU 1 in the controller 10 sets each of the target devices 20 and 30 (electronic devices B and C), which are connected to the bus 9 for power control, to the power saving mode in which only the auxiliary power supply is on (S21). Then, the CPU 1 in the controller 10 sends a power control command to power on to each of the target devices 20 and 30, and stores the sending time based on the system clock outputted from the timer 8 (S22). Subsequently, the CPU 1 in the controller 10 periodically sends a power status command to each of the target devices 20 and 30 so as to inquire the power status until each of the target devices 20 and 30 changes to the power-on state (S23). After receiving from each of the target devices a response indicating that the change to the power-on state has been completed, the CPU 1 in the controller 10 stores the reception time (S24). Subsequently, the CPU 1 in the controller 10 calculates the time intervals between the sending time for the sent command and the reception times for the respective responses from the target devices 20 and 30, and stores the time intervals as power-on state change times in the database 23 (S25). After the setting to the power-on state is completed for all the target devices 20 and 30 (S26), the CPU 1 in the controller 10 sends a power control command to power off to each of the target devices 20 and 30, and stores the sending time based on the system clock outputted from the timer 8 (S27). Subsequently, the CPU 1 in the controller 10 periodically sends a power status command to each of the target devices 20 and 30 so as to inquire the power status until each of the target devices 20 and 30 changes to the power-off state (S28). After receiving from each of the target devices 20 and 30 a response indicating that the change to the power-off state has been completed, the CPU 1 in the controller 10 stores the reception time (S29). Subsequently, the CPU 1 in the controller 10 calculates the time intervals between the sending time for the power control command and the reception times for the respective responses from the target devices 20 and 30, and stores the time intervals as power-off state change times in the database 23 (S30). In this manner, the power-on state change time and the power-off state change time for each of the target devices 20 and 30 can be stored in advance in the database 23 that stores initial setting data.

FIG. 6 shows an example of power-on state and power-off state change time data on a plurality of target devices (here, electronic devices B to F) that is acquired in the above process. As can be seen from this data, the target devices have different power-on state and power-off state change times. This means that each of the target devices has its optimal time interval for inquiry of the power status. By referencing the power status change times, the optimal time intervals for the inquiry can be determined.

Referring now to FIG. 5 and FIG. 6, it is described how the controller 10 performs power control for the target device 20 by an AV/C command after the above described initial setting (i.e., for a second or subsequent time). First, the CPU 1 in the controller 10 sends a power control command to power on or power off to the target device 20, which is to be controlled, and stores the sending time (S40). The CPU 1 in the controller 10 then reads out the power-on state or power-off state change time for the target device 20 from the database 23 shown in FIG. 6 (S41). Where the target device 20 is the electronic device B, 1000 msec or 800 msec shown in FIG. 6 is read out when the target device 20 should be powered on or powered off. After the read power-on state or power-off state change time (1000 msec or 800 msec) for the target device has passed from the sending of the power control command, the CPU 1 in the controller 10 sends to the target device 20 a power status command to inquire the power status (S42), and receives from the target device 20 a response indicating that the change of the power status has been completed (S43). In this manner, the controller 10 sends the power status command to inquire the power status in accordance with the time needed for each of the target devices to change from the power-off state to the power-on state or from the power-on state to the power-off state (1000 msec or 800 msec for the electronic device b). Therefore, the controller 10 does not have to unnecessarily repeat the sending of the inquiry command. Accordingly, the number of times the command is sent can be reduced. The power status change time data is acquired by periodically sending the power status command. Therefore, the acquired power status change time can be accurate, so that the time for inquiry at the power control performed for a second or subsequent time can be optimally set.

When the target device 20 (electronic device B) or other target device (electronic device C, D, E, or F) is disconnected from the IEEE 1394 bus 9, the power status change time associated with the disconnected target device is deleted from the database 23. Further, when the controller 10 recognizes that the disconnected target device is restarted and connected to the bus 9, the 1394 bus power management portion 22 in the controller 10 recreates initial data on the power status change time for the target device recognized as being connected again.

As described above, when an STB as a controller comprising a 1394 power management portion remotely controls via an IEEE 1394 bus the main power supply of a DVCR, a DVD recorder, or other target device, which is in the power saving mode, in an electronic device system where, for example, the STB, the DVCR, the DVD recorder, and so on are connected via the IEEE 1394 bus to be networked, the number of times the power status command is sent can be decreased to reduce the bus bandwidth usage by making in advance a database of power status change times for the DVCR, the DVD recorder, and other devices.

According to the electronic device system of the above described embodiment, the controller 10 periodically sends the power status command for inquiring the power status to the target device 20 (or to other target device) and acquires in advance the power status change time data to store it in the database 23. Thereby, based on the power status change time, the controller 10 can determine the time interval for sending the power status command for inquiry of the power status that is sent after the power control command is sent from the controller 10 to the target device 20 for a second or subsequent time. Accordingly, the controller 10 can send the power status command after an optimal time interval in accordance with the time actually needed for the target device 20 to change the power status of the main power supply portion 5 between the power-on state and the power-off state. This can eliminate the need to unnecessarily send the power status command, thus decreasing the number of times the power status command is sent so as to reduce the amount of bandwidth used on the IEEE 1394 bus. Accordingly, bus bandwidth usage can be reduced so that the efficiency in the use of the IEEE 1394 bus bandwidth can be improved.

The present invention has been described above using a presently preferred embodiment, but those skilled in the art will appreciate that various modifications are possible. For example, when a user wants to immediately start recording video signals received by an STB on a DVCR, a DVD recorder, or other target device by using the STB as a controller, the present invention enables a recording device having a shorter power status change time, which is stored in advance, of the target devices to be preferentially selected for recording of the video signals.

This application is based on Japanese patent application 2006-149657 filed May 30, 2006, the contents of which are hereby incorporated by reference.

What is claimed is:

1. An electronic device system in which a plurality of electronic devices each comprising an IEEE 1394 serial interface having an AV/C Digital Interface Command Set (hereinafter referred to as an AV/C command) are networked via an IEEE 1394 serial bus, wherein the plurality of electronic devices include a controller on the network and a target device for which the controller performs power control, wherein the controller comprises:

command sending means for sequentially sending via the bus a power control command to change power status of the target device between power-on state and power-off state and a power status command to inquire the power status of the target device;

change time calculating means for calculating power status change time needed for the target device to change the power status between the power-on state and the power-off state based on a response to the power status command that is received from the target device;

storage means for storing the power status change time calculated by the change time calculating means; and time interval determining means for determining a time interval from sending of the power control command to sending of the power status command based on the power status change time stored in the storage means when the controller performs power control for a second or subsequent time.

2. The electronic device system according to claim 1, wherein the target device has a main power control portion to control a main power supply in the target device and a power status detecting portion to detect power status of the main power supply, wherein after sending the power control command to the main power control portion in the target device, the command sending means in the controller continues to periodically send the power status command until the target device changes to the power-on state or the power-off state, wherein when the power status detecting portion in the target device detects a power status change, the change time calculating means determines the power status change time by calculating a time interval between time at which the power control command is sent and time at which a response indicating completion of the power status change is received from the target device.

3. The electronic device system according to claim 2, wherein when the controller performs power control for the target device for a second or subsequent time, the controller sends the power status command to the target device after the power status change time has passed from sending of the power control command.

4. The electronic device system according to claim 1, wherein when the controller performs power control for the target device for a second or subsequent time, the controller sends the power status command to the target device after the power status change time has passed from sending of the power control command.

5. A controller to be connected to an IEEE 1394 serial bus, comprising:

command sending means for sequentially sending via the bus a power control command to change power status of a target device on a network between power-on state and power-off state and a power status command to inquire the power status of the target device;

change time calculating means for calculating power status change time needed for the target device to change the power status between the power-on state and the power-off state based on a response to the power status command that is received from the target device;

storage means for storing the power status change time calculated by the change time calculating means; and time interval determining means for determining a time interval from sending of the power control command to sending of the power status command based on the power status change time stored in the storage means when the controller performs power control for a second or subsequent time.

6. The controller according to claim 5, wherein when the controller performs power control for a target device for a second or subsequent time, the controller sends the power status command to the target device after the power status change time has passed from sending of the power control command.

* * * * *